US012498650B2

(12) United States Patent
Ooka et al.

(10) Patent No.: US 12,498,650 B2
(45) **Date of Patent: *Dec. 16, 2025**

(54) DEVELOPING CARTRIDGE INCLUDING CASING AND FIRST AND SECOND AGITATORS FOR AGITATING TONER ACCOMMODATED IN CASING

(71) Applicant: BROTHER KOGYO KABUSHIKI KAISHA, Nagoya (JP)

(72) Inventors: Kazuaki Ooka, Nagoya (JP); Junichi Hashimoto, Toyohashi (JP); Shota Iriyama, Toyokawa (JP); Keigo Nakajima, Nagoya (JP); Kengo Yada, Seki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/912,255

(22) Filed: Oct. 10, 2024

(65) Prior Publication Data

US 2025/0110422 A1 Apr. 3, 2025

Related U.S. Application Data

(63) Continuation of application No. 18/064,360, filed on Dec. 12, 2022, now Pat. No. 12,147,171, which is a (Continued)

(30) Foreign Application Priority Data

Sep. 28, 2018 (JP) ................................ 2018-183247

(51) Int. Cl.

| | |
|---|---|
| ***G03G 15/08*** | (2006.01) |
| ***G03G 21/16*** | (2006.01) |
| ***G03G 21/18*** | (2006.01) |

(52) U.S. Cl.

CPC ..... *G03G 15/0808* (2013.01); *G03G 21/1676* (2013.01); *G03G 21/1814* (2013.01); *G03G 2215/066* (2013.01)

(58) Field of Classification Search

CPC ............... G03G 21/1652; G03G 15/80; G03G 21/1867; G03G 2221/166

See application file for complete search history.

(56) References Cited

U.S. PATENT DOCUMENTS

| | | | |
|---|---|---|---|
| 5,640,651 | A | 6/1997 | Katoh et al. |
| 6,301,457 | B1 | 10/2001 | Chadani et al. |

(Continued)

FOREIGN PATENT DOCUMENTS

| | | | |
|---|---|---|---|
| CN | 1577152 | A | 2/2005 |
| CN | 101354560 | A | 1/2009 |

(Continued)

OTHER PUBLICATIONS

International Search Report and Written Opinion issued in related International Application No. PCT/JP2019/026057, Sep. 10, 2019.

(Continued)

*Primary Examiner* — Sevan A Aydin

(74) *Attorney, Agent, or Firm* — Merchant & Gould P.C.

(57) ABSTRACT

A developing cartridge includes: a casing, a developing roller, a first agitator, a supply roller, and a second agitator. The casing is configured to accommodate toner. The developing roller is rotatable about a developing roller rotation axis extending in a first direction. The first agitator is configured to agitate the toner. The first agitator is rotatable about a first agitator rotation axis extending in the first direction. The supply roller is positioned between the first agitator and the developing roller. The supply roller is rotatable about a supply roller rotation axis extending in the first direction. The second agitator is positioned between the (Continued)

supply roller and the first agitator. The second agitator is rotatable about a second agitator rotation axis extending in the first direction. A rotation locus of the second agitator is positioned outside of a rotation locus of the first agitator.

21 Claims, 11 Drawing Sheets

Related U.S. Application Data continuation of application No. 17/476,975, filed on Sep. 16, 2021, now Pat. No. 11,537,062, which is a continuation of application No. 17/152,073, filed on Jan. 19, 2021, now Pat. No. 11,143,981, which is a continuation of application No. 16/987,488, filed on Aug. 7, 2020, now Pat. No. 10,901,340, which is a continuation of application No. 16/458,749, filed on Jul. 1, 2019, now Pat. No. 10,739,698.

(56) References Cited

U.S. PATENT DOCUMENTS

| | | | |
|---|---|---|---|
| 10,739,698 | B2 | 8/2020 | Ooka |
| 2005/0002698 | A1 | 1/2005 | Jeon |
| 2005/0111882 | A1 | 5/2005 | Sudo et al. |
| 2006/0239722 | A1 | 10/2006 | Tanaka et al. |
| 2006/0257167 | A1 | 11/2006 | Kim et al. |
| 2007/0212124 | A1 | 9/2007 | Tsunoda |
| 2008/0205937 | A1 | 8/2008 | Hori |
| 2009/0180811 | A1 | 7/2009 | Suganuma |
| 2009/0190970 | A1 | 7/2009 | Shimada |
| 2009/0257781 | A1 | 10/2009 | Fuji |
| 2010/0166465 | A1 | 7/2010 | Mase |
| 2010/0319212 | A1 | 12/2010 | Iga |
| 2011/0158700 | A1 | 6/2011 | Iwata |
| 2011/0229155 | A1 | 9/2011 | Yoshii et al. |
| 2012/0243888 | A1 | 9/2012 | Yoshii et al. |
| 2012/0321346 | A1 | 12/2012 | Fukamachi et al. |
| 2014/0086638 | A1 | 3/2014 | Sato |
| 2016/0103403 | A1 | 4/2016 | Kim et al. |
| 2017/0097588 | A1 | 4/2017 | Fukamachi et al. |
| 2017/0102641 | A1 | 4/2017 | Sato |
| 2017/0277074 | A1 | 9/2017 | Mori |
| 2018/0004123 | A1 | 1/2018 | Itabashi et al. |
| 2018/0107155 | A1 | 4/2018 | Shimizu et al. |
| 2018/0181023 | A1 | 6/2018 | Jang et al. |

FOREIGN PATENT DOCUMENTS

| | | | |
|---|---|---|---|
| CN | 106575093 | A | 4/2017 |
| CN | 107561888 | A | 1/2018 |
| EP | 0 715 226 | A2 | 6/1996 |
| EP | 1 717 643 | A1 | 11/2006 |
| EP | 3 343 298 | A1 | 7/2018 |
| JP | 2-287475 | A | 11/1990 |
| JP | 7-325452 | A | 12/1995 |
| JP | 8-179608 | A | 7/1996 |
| JP | 8-305250 | A | 11/1996 |
| JP | 2000-56549 | A | 2/2000 |
| JP | 2000-347487 | A | 12/2000 |
| JP | 2002-229332 | A | 8/2002 |
| JP | 2009-157345 | A | 7/2009 |
| JP | 2009-282193 | A | 12/2009 |
| JP | 2010-217225 | A | 9/2010 |
| JP | 2016-142868 | A | 8/2016 |
| JP | 2018-66973 | A | 4/2018 |
| KR | 10-2018-0076548 | A | 7/2018 |

OTHER PUBLICATIONS

Office Action (Notice of Reasons for Refusal) issued in corresponding Japanese Patent Application No. 2018-183247, Oct. 26, 2021.

Office Action issued in corresponding Canadian Patent Application No. 3, 114, 144, Apr. 11, 2022.

Extended European Search Report issued in corresponding European Patent Application No. 19756083.2, May 20, 2022.

Office Action (Notice of Reasons for Refusal) issued in corresponding Japanese Patent Application No. 2022-045728, Feb. 14, 2023.

Office Action issued in corresponding Chinese Patent Application No. 201980001524.3, Mar. 22, 2023.

DEVELOPING CARTRIDGE INCLUDING CASING AND FIRST AND SECOND AGITATORS FOR AGITATING TONER ACCOMMODATED IN CASING

CROSS REFERENCE TO RELATED APPLICATION

This application is a continuation of U.S. patent application Ser. No. 18/064,360 filed Dec. 12, 2022, which is a continuation of U.S. patent application Ser. No. 17/476,975, filed Sep. 16, 2021, now U.S. Pat. No. 11,537,062, which is a continuation of U.S. patent application Ser. No. 17/152,073 filed Jan. 19, 2021, now U.S. Pat. No. 11,143,981, which is a continuation of U.S. patent application Ser. No. 16/987,488 filed Aug. 7, 2020, now U.S. Pat. No. 10,901,340, which is a continuation of U.S. patent application Ser. No. 16/458,749 filed Jul. 1, 2019, now U.S. Pat. No. 10,739,698, which further claims priority from Japanese Patent Application No. 2018-183247 filed on Sep. 28, 2018. The entire content of all applications is incorporated herein by reference.

TECHNICAL FIELD

The present disclosure relates to a developing cartridge.

BACKGROUND

There is conventionally known an electro-photographic type image forming apparatus such as an LED printer. This type of image forming apparatus includes a frame provided with a photosensitive drum, and a developing cartridge attachable to and detachable from the frame. For example, prior art discloses a conventional image forming apparatus including a developing cartridge.

The developing cartridge disclosed in the prior art includes a casing, a developing roller, an agitator, and a supply roller. The casing can accommodate toner. The developing roller is rotatable about a rotation axis extending in a first direction. The agitator rotates about a rotation axis extending in the first direction to agitate the toner accommodated in the casing. The agitator is positioned spaced away from the developing roller in a second direction. The supply roller rotates about a rotation axis extending in the first direction to supply the toner to the developing roller. The supply roller is positioned between the developing roller and the agitator in the second direction.

SUMMARY

However, in the developing cartridge disclosed in the prior art, in an internal space of the casing, there is a region where sufficient agitation of toner cannot be achieved by only rotation of the agitator. For example, toner stagnation may occur at a region ambient to the supply roller when residual amount of toner in the casing is low.

In view of the foregoing, it is an object of the present disclosure to provide a developing cartridge capable of sufficiently agitating toner in an internal space of a casing.

In order to attain the above and other objects, according to one aspect, the disclosure provides a developing cartridge including: a casing, a developing roller, a first agitator, a supply roller, and a second agitator. The casing is configured to accommodate toner. The developing roller is rotatable about a developing roller rotation axis extending in a first direction. The first agitator is configured to agitate the toner.

The first agitator is rotatable about a first agitator rotation axis extending in the first direction. The supply roller is positioned between the first agitator and the developing roller. The supply roller is rotatable about a supply roller rotation axis extending in the first direction. The second agitator is positioned between the supply roller and the first agitator. The second agitator is rotatable about a second agitator rotation axis extending in the first direction. A rotation locus of the second agitator is positioned outside of a rotation locus of the first agitator.

BRIEF DESCRIPTION OF THE DRAWINGS

The particular features and advantages of the disclosure as well as other objects will become apparent from the following description taken in connection with the accompanying drawings, in which.

DETAILED DESCRIPTION

An embodiment of the present disclosure will be described while referring to the accompanying drawings.

Figure 2:
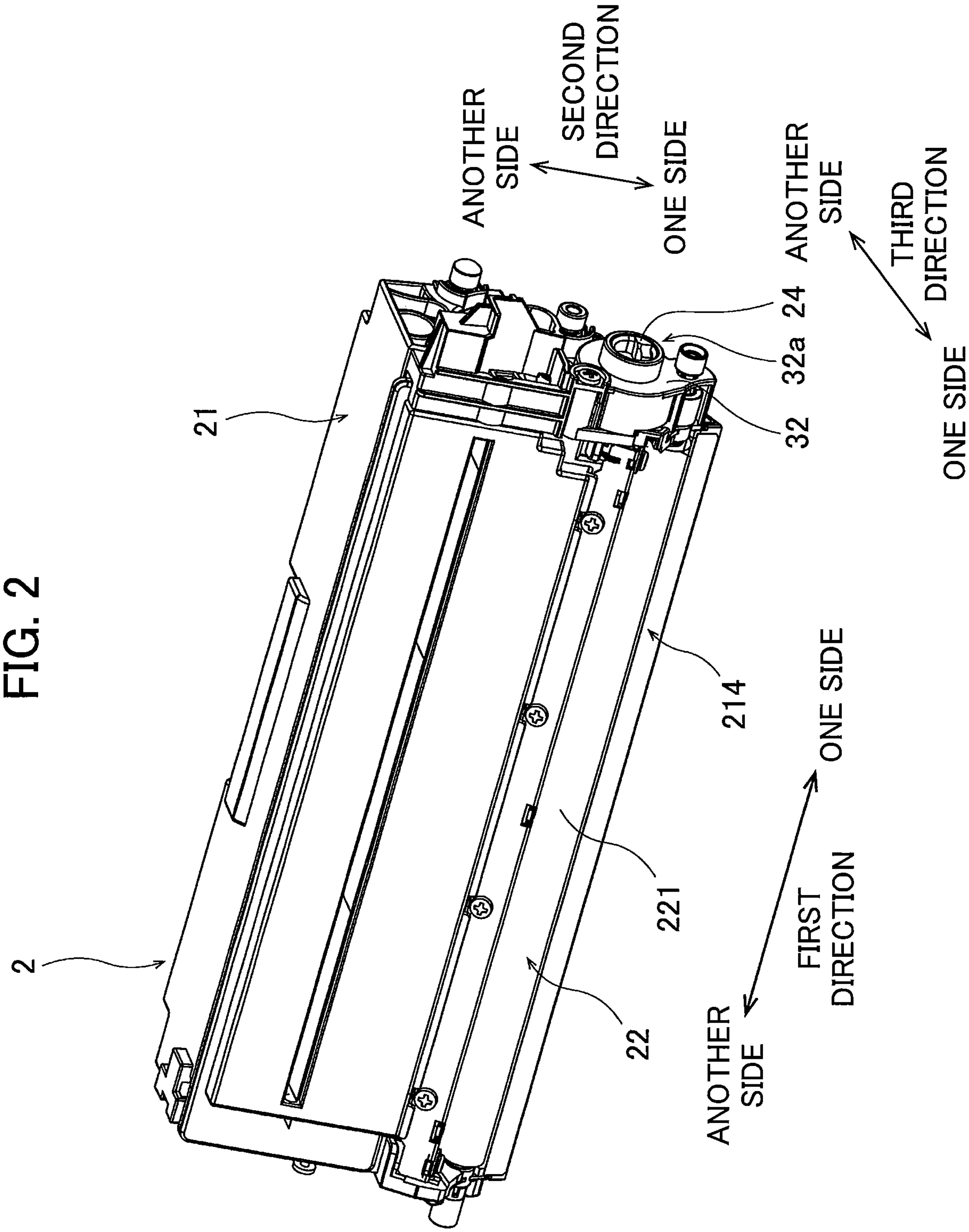
FIG. 2 is a perspective view of a developing cartridge according to an embodiment of the present disclosure.
Figure 3:
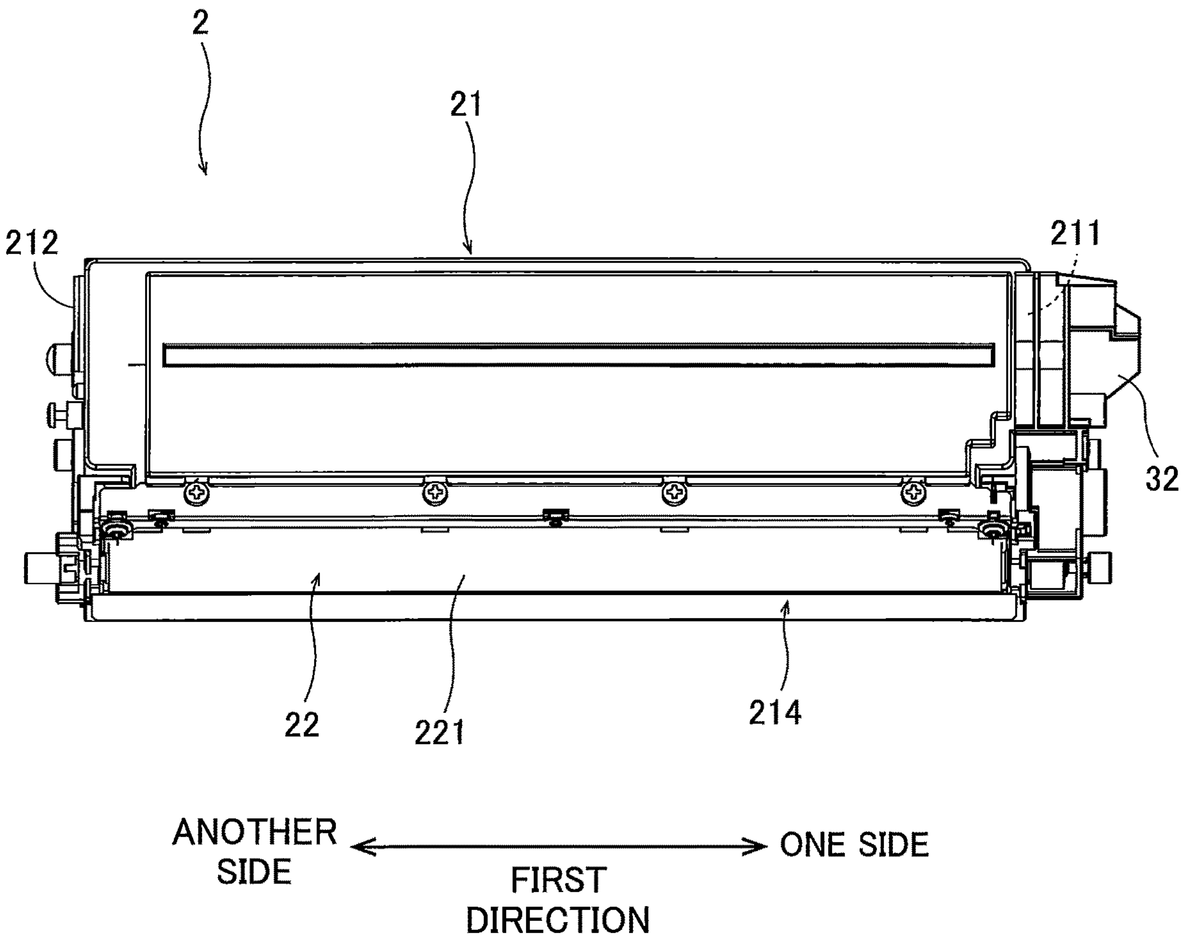
FIG. 3 is a view of the developing cartridge as viewed in a third direction.
Figure 6:
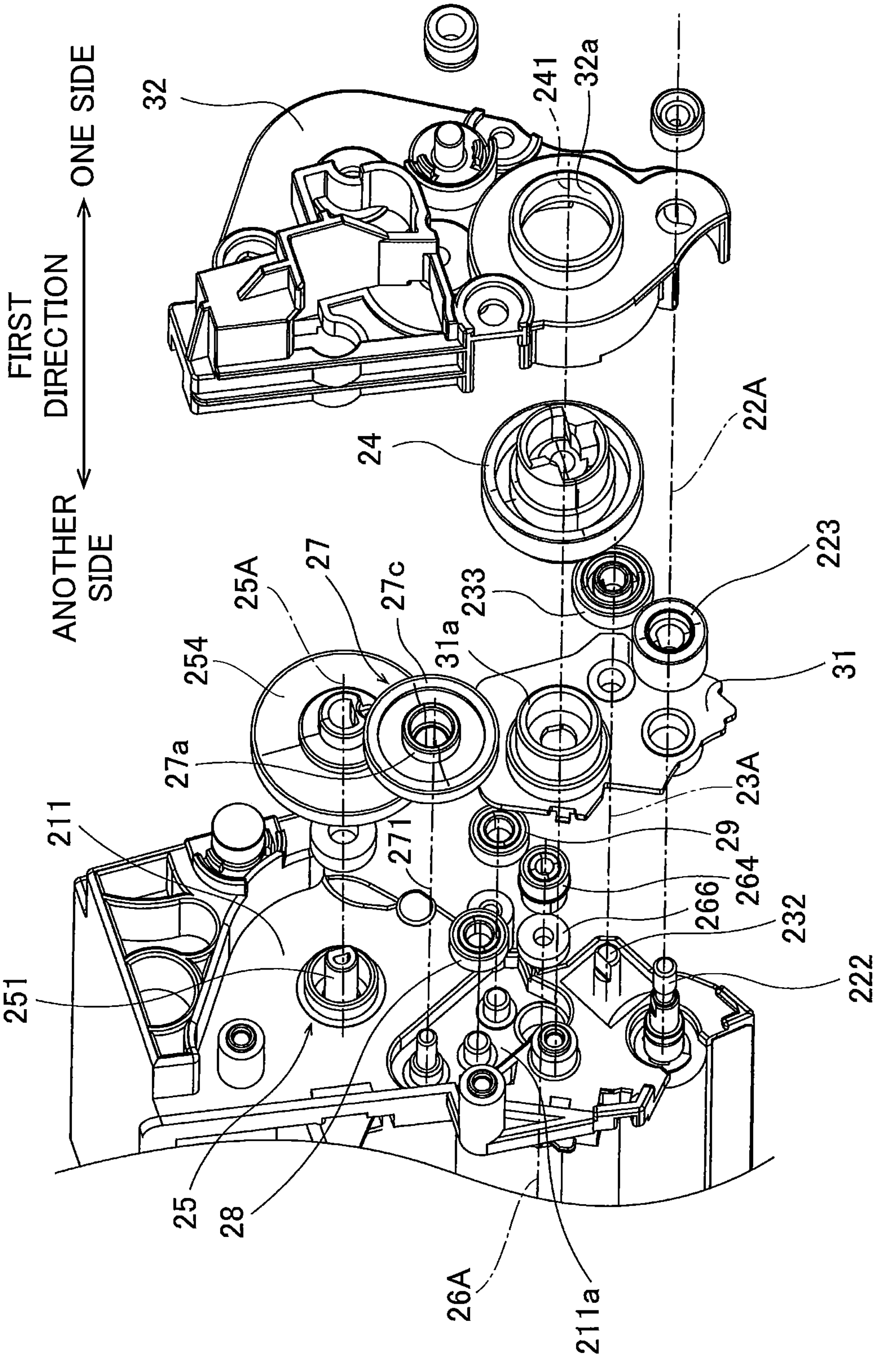
FIG. 6 is an exploded perspective view of a portion of the developing cartridge.

A developing cartridge 2 according to the present embodiment includes a developing roller 22 and a first agitator 25 described later in detail. Here, as illustrated in FIGS. 2, 3, and 6, a direction where a developing roller rotation axis 22A of the developing roller 22 extends will be referred to as "first direction". Further, a direction connecting the developing roller rotation axis 22A and a first agitator rotation axis 25A of the first agitator 25 will be referred to as "second direction". The second direction crosses the first direction, and preferably, is perpendicular to the first direction. A direction crossing both the first direction and the second direction will be referred to as "third direction". Preferably, the third direction is perpendicular to both the first direction and the second direction.

<1. Image Forming Apparatus>

Figure 1:
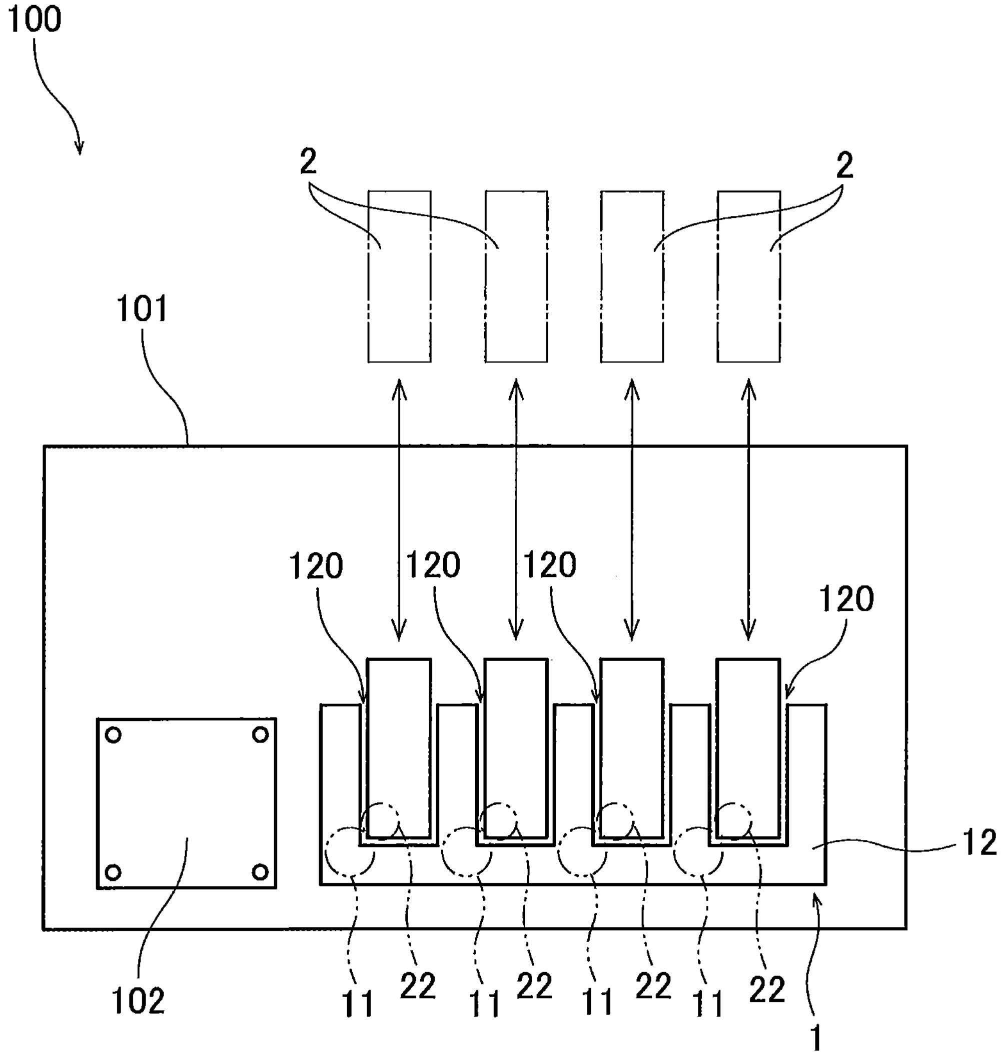
FIG. 1 is a schematic view of an image forming apparatus.

FIG. 1 is a schematic view of an image forming apparatus 100. The image forming apparatus 100 is an electro-photographic type printer. Examples of the image forming apparatus 100 include a laser printer and an LED printer. As illustrated in FIG. 1, the image forming apparatus 100 includes a main body casing 101, a controller 102, a drum unit 1, and four developing cartridges 2. The four developing cartridges 2 are individually attachable to the drum unit 1. Further, the drum unit 1 to which the four developing cartridges 2 are attached is attachable to and detachable from the main body casing 101.

The four developing cartridges 2 accommodate therein developing agents (for example, toners in the present embodiment) of different colors (for example, cyan, magenta, yellow, and black). The image forming apparatus 100 forms an image on a recording surface of a printing sheet using toners supplied from the four developing cartridges 2. However, the number of the developing cartridges 2 to be attached to the drum unit 1 is not restrictive. One to three developing cartridges 2 or not less than five developing cartridges 2 are available.

The controller 102 illustrated in FIG. 1 is positioned in the main body casing 101. The controller 102 is constituted by, for example, a circuit board. The controller 102 includes a processor such as a CPU, and various memories. The controller 102 is configured to execute various processes for the image forming apparatus 100 by the processor operating in accordance with programs.

<2. Drum Unit>

The drum unit 1 illustrated in FIG. 1 includes four photosensitive drums 11 and a frame 12. The photosensitive drum 11 is configured to transfer, onto a printing sheet, toner supplied from the developing cartridge 2. The four photosensitive drums 11 are arrayed with intervals therebetween. Each photosensitive drum 11 has a cylindrical outer circumferential surface extending in the first direction. The outer circumferential surface of the photosensitive drum 11 is coated with photosensitive material. Each photosensitive drum 11 is rotatable about a drum rotation axis extending in the first direction.

The frame 12 is configured to hold the four photosensitive drums 11. The frame 12 includes four cartridge holding portions 120. The four cartridge holding portions 120 are arrayed with intervals therebetween. Each of the four developing cartridges 2 is attached to a corresponding one of the four cartridge holding portions 120.

<3. Details of Developing Cartridge>

Figure 4:
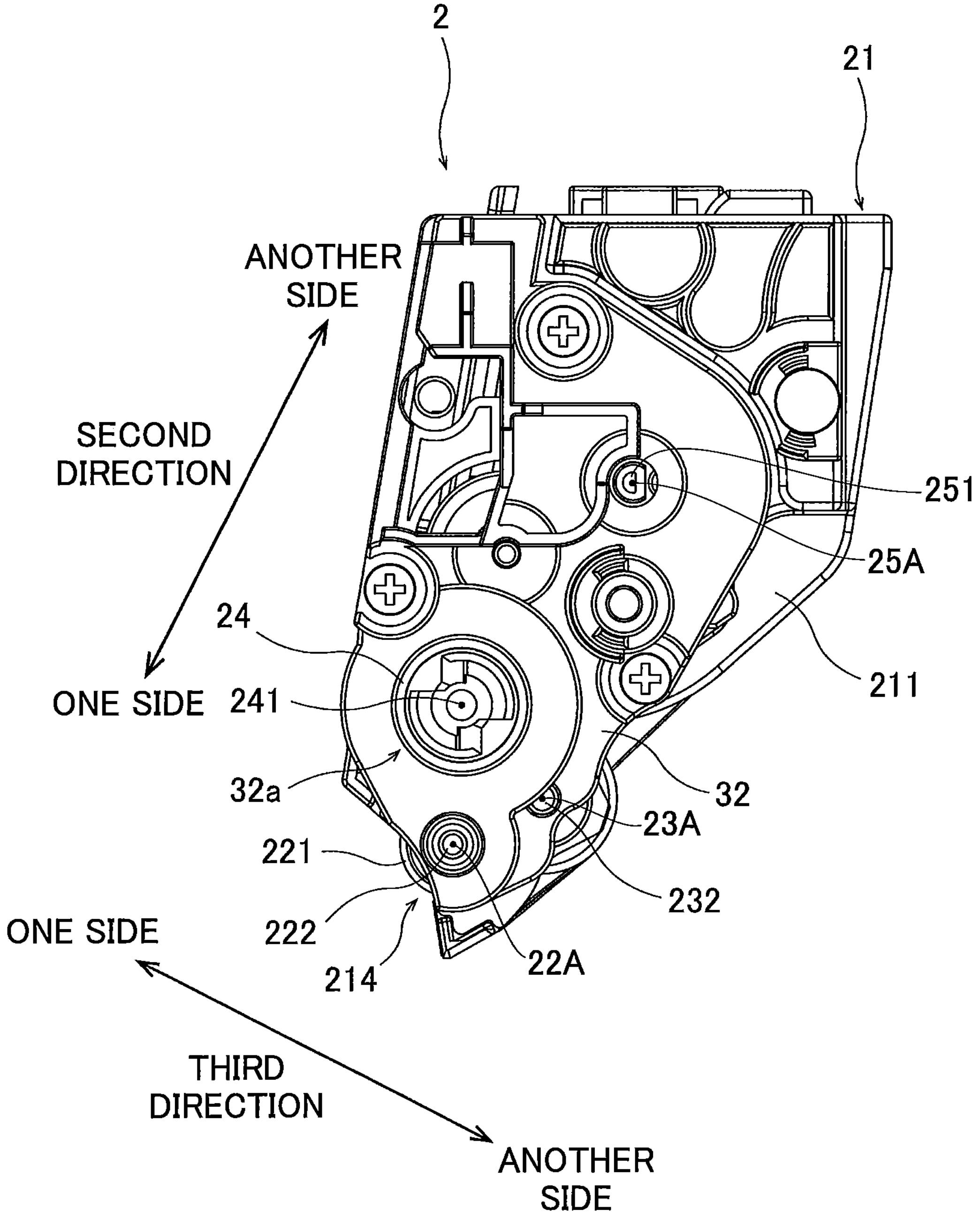
FIG. 4 is a view of the developing cartridge as viewed in a first direction.
Figure 5:
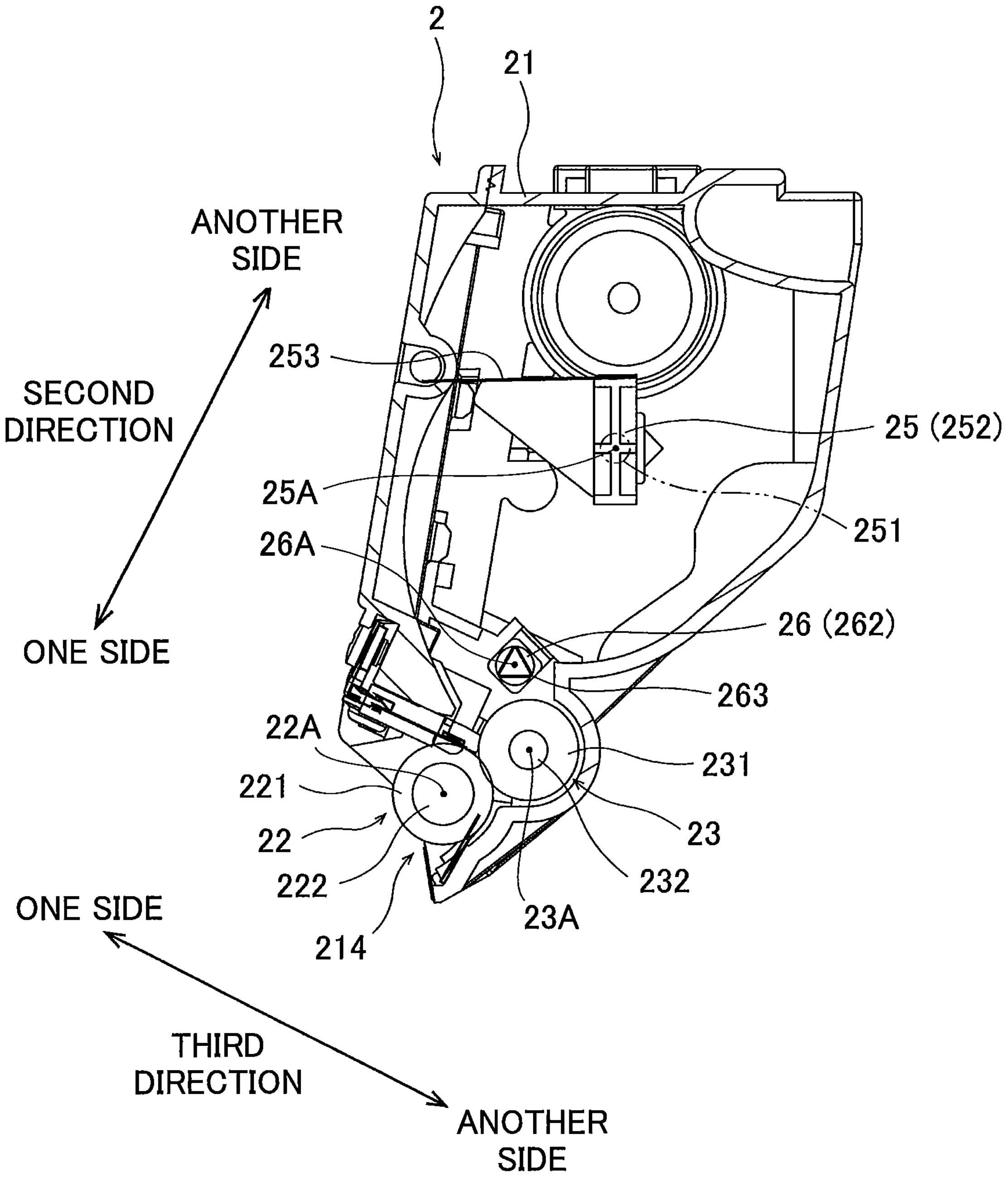
FIG. 5 is a cross-sectional view of the developing cartridge taken along a plane perpendicular to the first direction.

FIG. 2 is a perspective view of the developing cartridge 2. FIG. 3 is a view of the developing cartridge 2 as viewed from one side in the third direction. FIG. 4 is a view of the developing cartridge 2 as viewed from one side in the first direction. FIG. 5 is a cross-sectional view of the developing cartridge 2 taken along a plane perpendicular to the first direction. As illustrated in FIGS. 2 and 3, the developing cartridge 2 includes a casing 21, the developing roller 22, a gear case 32, and a coupling 24. As illustrated in FIGS. 4 and 5, the developing cartridge 2 further includes a supply roller 23, the first agitator 25, and a second agitator 26.

The casing 21 illustrated in FIGS. 2 and 3 is a container in which toner is accommodatable. As illustrated in FIG. 3, the casing 21 extends in the first direction between a first outer surface 211 and a second outer surface 212. That is, the casing 21 has one end portion and the other end portion in the first direction; the one end portion is positioned at the one side in the first direction and has the first outer surface 211 whereas the other end portion is positioned at the other side in the first direction and has the second outer surface 212. Toner is accommodatable in an internal space of the casing 21. The casing 21 has an opening 214. The opening 214 is positioned at one end portion in the second direction of the casing 21. The internal space of the casing 21 is in communication with an outside of the casing 21 through the opening 214.

As illustrated in FIGS. 2 through 4, the gear case 32 is attached to the first outer surface 211 from the one side in the first direction so as to cover the first outer surface 211. The gear case 32 is fixed to the first outer surface 211 by a fastening member such as a screw. Specifically, a space is defined between the first outer surface 211 and an inner surface (i.e., a surface at the other side in the first direction) of the gear case 32, and the space accommodates therein a developing roller gear 223, a supply roller gear 233, a first agitator gear 254, a second agitator gear 264, the coupling 24, an idle gear 27, a first drive gear 28, and a second drive gear 29 those described later. The gear case 32 has a through-hole **32*a* through which the coupling 24 is exposed. As described later, the coupling 24 exposed through the through-hole 32*a* is configured to be connected to a drive shaft of the image forming apparatus 100**.

The developing roller 22 is rotatable about the developing roller rotation axis 22A extending in the first direction. As illustrated in FIG. 2, the developing roller 22 is positioned at the opening 214 of the casing 21. That is, the developing roller 22 is positioned at the one end portion in the second direction of the casing 21.

The developing roller 22 includes a developing roller body 221 and a developing roller shaft 222. The developing roller body 221 is a hollow cylindrical member extending in the first direction. The developing roller body 221 is made of an elastic material such as a rubber. The developing roller shaft 222 extends through the developing roller body 221 and is a solid cylindrical member extending along the developing roller rotation axis 22A. The developing roller shaft 222 is made of metal or electrically conductive resin.

The developing roller body 221 is fixed to the developing roller shaft 222 so as not to rotate relative to the developing roller shaft 222. The developing roller shaft 222 has one end portion in the first direction; the one end portion is positioned at the one side in the first direction. The one end portion in the first direction of the developing roller shaft 222 is fixed to the developing roller gear 223 so as not to rotate relative to the developing roller gear 223. With this configuration, when the developing roller gear 223 rotates, the developing roller shaft 222 also rotates and the developing roller body 221 is rotatable together with the developing roller shaft 222. As illustrated in FIG. 1, in a state where the developing cartridge 2 is attached to the drum unit 1, an outer circumferential surface of the developing roller body 221 is in contact with an outer circumferential surface of the photosensitive drum 11.

The supply roller 23 illustrated in FIG. 5 is rotatable about a supply roller rotation axis 23A extending in the first direction. In the casing 21, the supply roller 23 is positioned further in a direction from the one side to the other side in the third direction than the developing roller 22. The supply roller 23 is positioned between the first agitator rotation axis 25A of the first agitator 25 and the developing roller rotation axis 22A of the developing roller 22 in the second direction. The supply roller 23 includes a supply roller body 231 and a supply roller shaft 232. The supply roller body 231 is made of an elastic material such as a rubber. The supply roller shaft 232 is a solid cylindrical member extending along the supply roller rotation axis 23A. The supply roller shaft 232 extends through the supply roller body 231. The supply roller shaft 232 is made of metal or electrically conductive resin.

The supply roller body 231 is fixed to the supply roller shaft 232 so as not to rotate relative to the supply roller shaft 232. The supply roller shaft 232 has one end portion in the first direction; the one end portion is positioned at the one side in the first direction. The one end portion of the supply roller shaft 232 in the first direction is fixed to the supply roller gear 233 so as not to rotate relative to the supply roller gear 233. With this configuration, when the supply roller gear 233 rotates, the supply roller shaft 232 also rotates and the supply roller body 231 is rotatable together with the supply roller shaft 232.

As illustrated in FIG. 5, an outer circumferential surface of the supply roller body 231 of the supply roller 23 is in contact with the outer circumferential surface of the developing roller body 221 of the developing roller 22. When the developing roller 22 and the supply roller 23 rotate, toner in the casing 21 is supplied to the outer circumferential surface of the developing roller 22 through the supply roller 23. At this time, toner is subjected to triboelectric charging between the supply roller 23 and the developing roller 22. Further, bias voltage is applied to the developing roller shaft 222 and the supply roller shaft 232. Hence, by electrostatic force acting between toner and the outer circumferential surfaces of the supply roller body 231 and the developing roller body 221, toner is attracted to and carried on the outer circumferential surfaces of the supply roller body 231 and the developing roller body 221.

The first agitator 25 illustrated in FIG. 5 is configured to agitate toner accommodated in the casing 21. The first agitator 25 is rotatable about the first agitator rotation axis 25A extending in the first direction. The first agitator 25 includes a first agitator shaft 251 and a first agitator fin 253. The first agitator shaft 251 extends along the first agitator rotation axis 25A. The first agitator shaft 251 has one end portion in the first direction; the one end portion is positioned at the one side in the first direction. The one end portion of the first agitator shaft 251 in the first direction is fixed to the first agitator gear 254 so as not to rotate relative to the first agitator gear 254. The first agitator gear 254 is positioned outward of the first outer surface 211 of the casing 21.

As illustrated in FIG. 5, the first agitator shaft 251 includes a fin support portion 252 which is generally plate shaped. The fin support portion 252 is positioned in the casing 21 and extends in the first direction. The first agitator fin 253 is fixed to the fin support portion 252. The first agitator fin 253 extends in the first direction and also extends radially outwardly with respect to the first agitator rotation axis 25A. The first agitator fin 253 is, for example, a film having flexibility.

The tip end portion of the first agitator fin 253 contacts the inner surface of the casing 21. When the first agitator gear 254 rotates in a clockwise direction as viewed from the one side in the first direction, the first agitator shaft 251 also rotates and the first agitator fin 253 also rotates together with the fin support portion 252 about the first agitator rotation axis 25A. During this rotation of the first agitator fin 253, the tip end portion of the first agitator fin 253 is flexed and deformed by contact with the inner surface of the casing 21.

Figure 10:
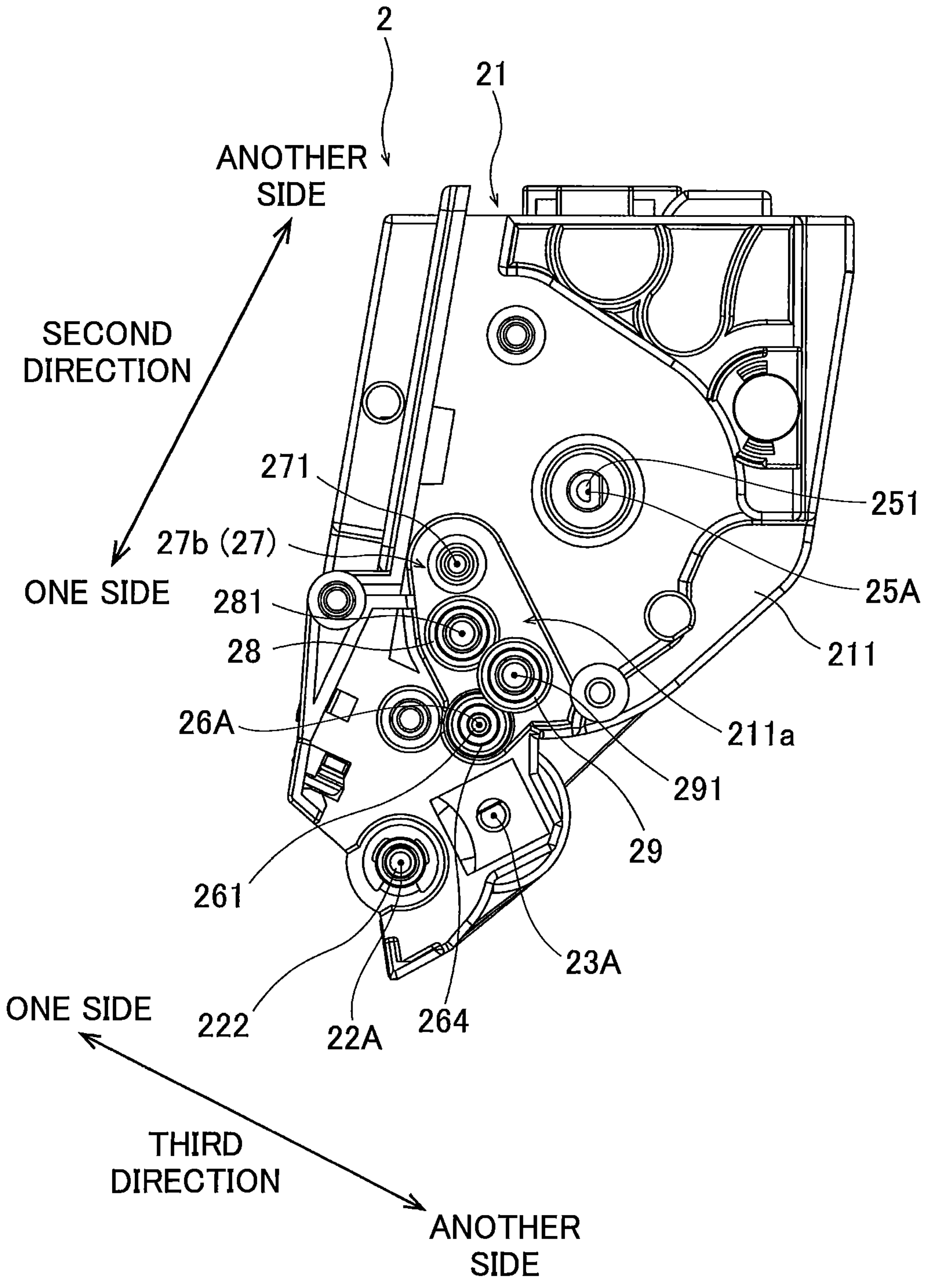
FIG. 10 is a view of the developing cartridge as viewed in the first direction and in a state where a support member is removed from the state of FIG. 9.

The second agitator 26 is configured to agitate toner accommodated in the casing 21. The second agitator 26 is rotatable about a second agitator rotation axis 26A extending in the first direction. As illustrated in FIG. 5, the second agitator 26 is positioned between the supply roller 23 and the first agitator 25 in the second direction. As illustrated in FIG. 10, the second agitator 26 includes a second agitator shaft 261. The second agitator shaft 261 is a columnar member extending along the second agitator rotation axis 26A.

As illustrated in FIG. 5, the second agitator shaft 261 includes an agitating portion 262 having a polygonal columnar shape. In other words, the second agitator 26 has a polygonal columnar shape rotatable about the second agitator rotation axis 26A. The agitating portion 262 is positioned in the casing 21 and extends in the first direction. In the present embodiment, the agitating portion 262 has a triangular prism shape whose three corner portions (i.e., three ridge portions) each function as a second agitator fin 263.

The second agitator shaft 261 has one end portion in the first direction; the one end portion is positioned at the one side in the first direction. The one end portion of the second agitator shaft 261 in the first direction is fixed to the second agitator gear 264 so as not to rotate relative to the second agitator gear 264. When the second agitator gear 264 rotates, the second agitator shaft 261 also rotates and the second agitator fin 263 also rotates together with the agitating portion 262 about the second agitator rotation axis 26A.

Figure 7:
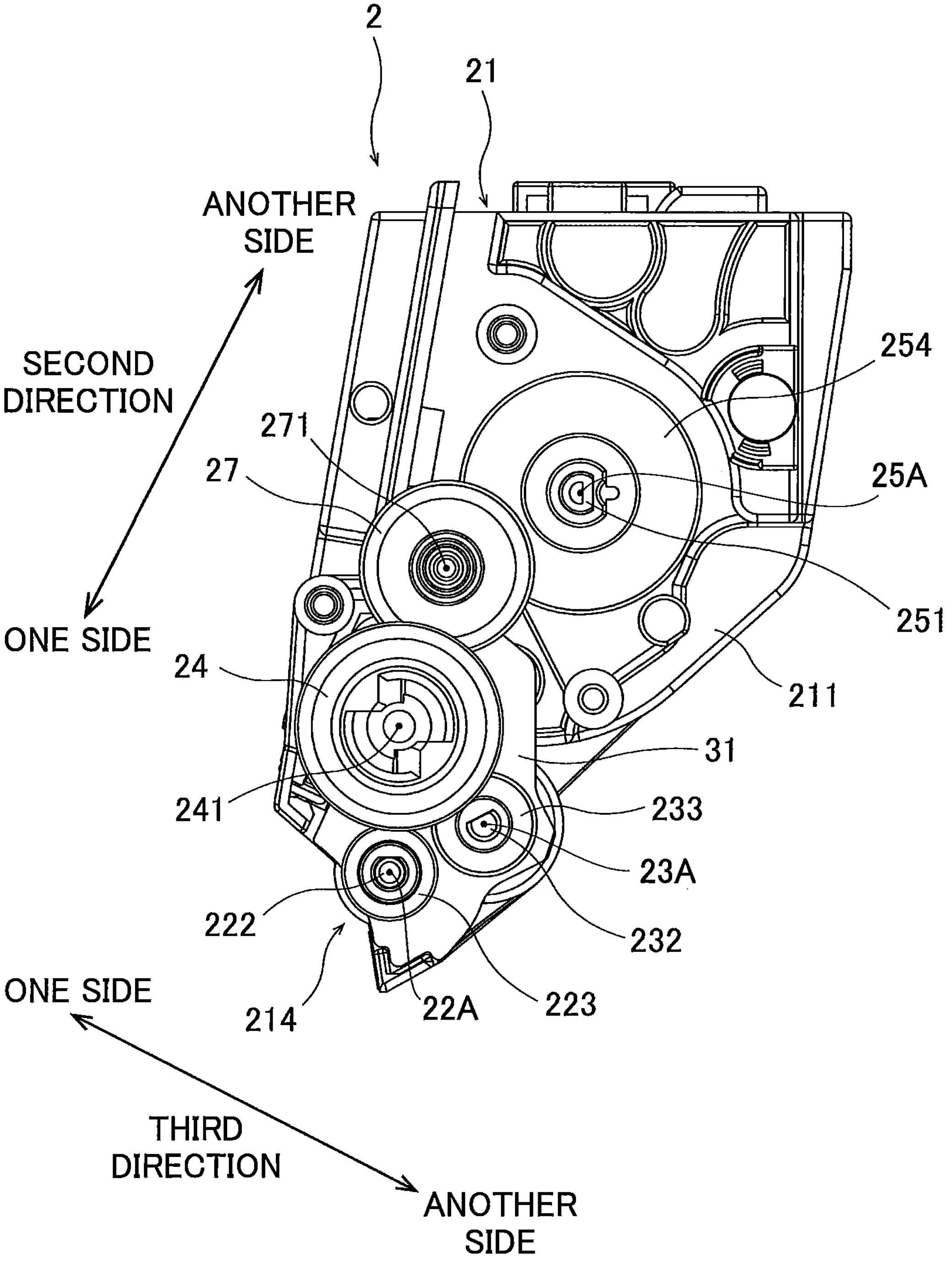
FIG. 7 is a view of the developing cartridge as viewed in the first direction and in a state where a gear case is removed.
Figure 8:
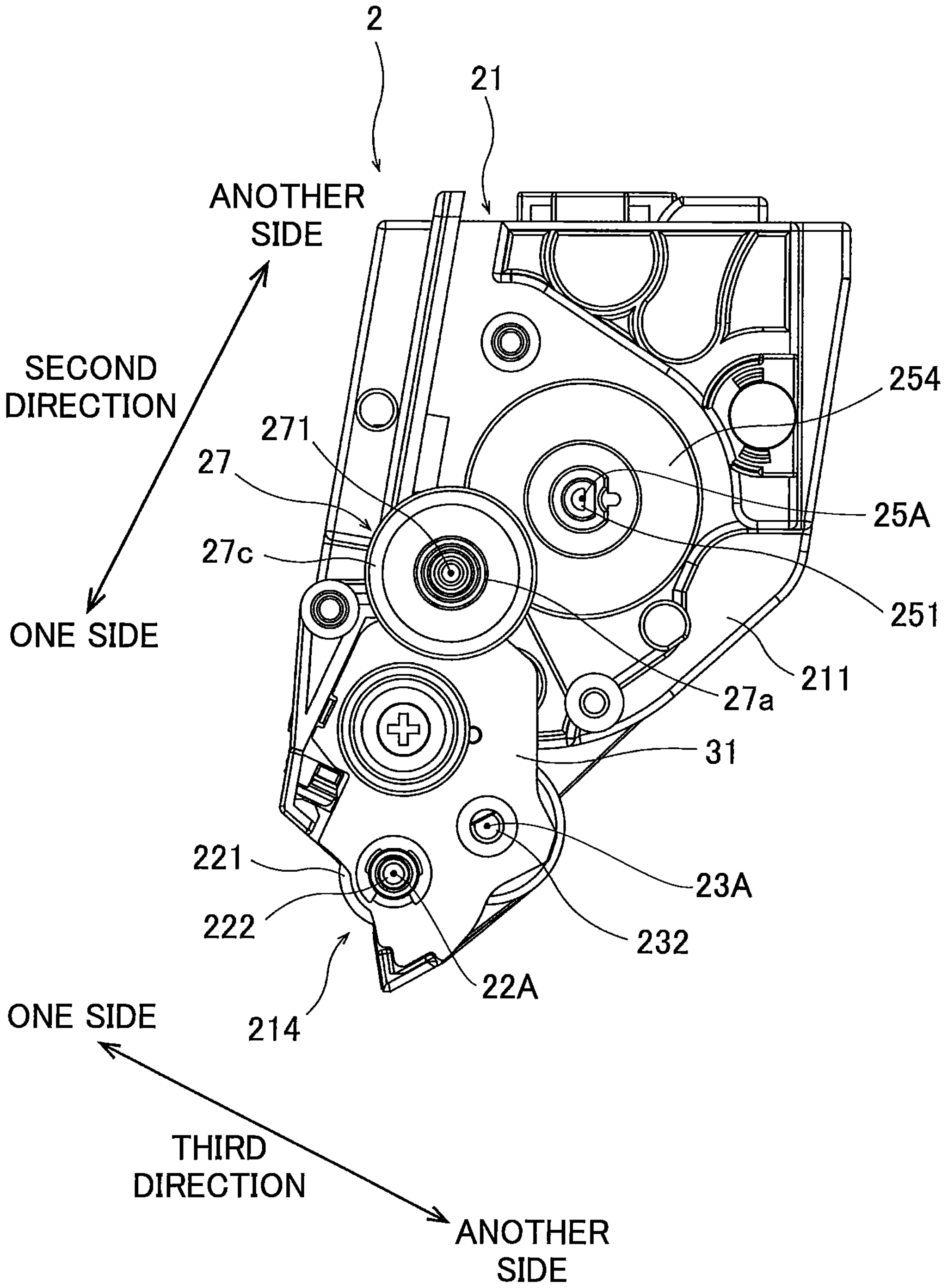
FIG. 8 is a view of the developing cartridge as viewed in the first direction and in a state where a coupling, a developing roller gear, and a supply roller gear are removed from the state of FIG. 7.
Figure 9:
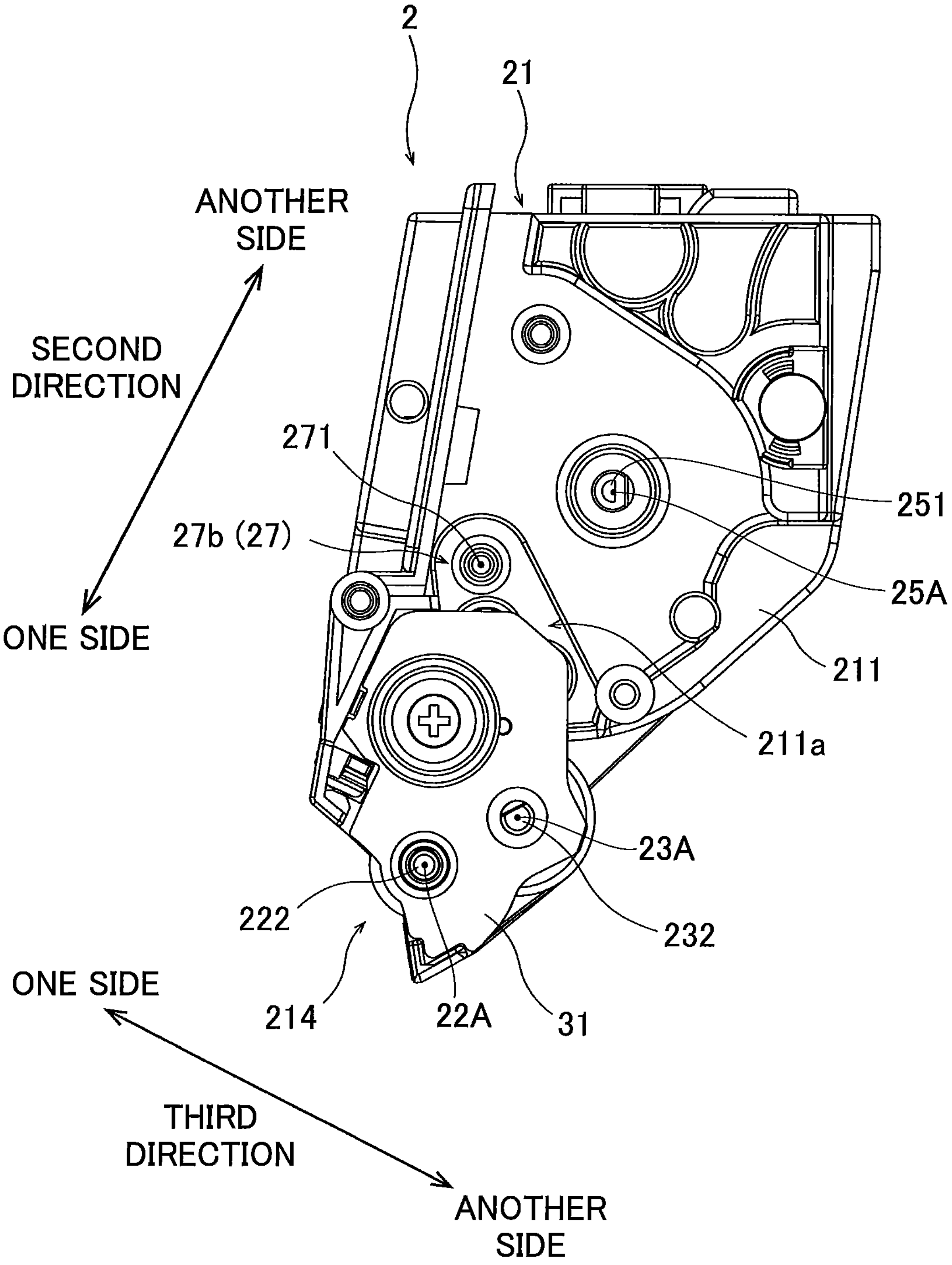
FIG. 9 is a view of the developing cartridge as viewed in the first direction and in a state where an idle gear and a first agitator gear are removed from the state of FIG. 8.

FIG. 6 is an exploded perspective view of a portion of the developing cartridge 2. As illustrated in FIG. 6, the developing cartridge 2 further includes the coupling 24, the idle gear 27, the first drive gear 28, the second drive gear 29, and a support member 31. FIG. 7 illustrates the developing cartridge 2 as viewed from the one side in the first direction and in a state where the gear case 32 is removed. FIG. 8 illustrates a state where the coupling 24, the developing roller gear 223, and the supply roller gear 233 are removed from the state of FIG. 7. FIG. 9 illustrates a state where the idle gear 27 and the first agitator gear 254 are removed from the state of FIG. 8. FIG. 10 illustrates a state where the support member 31 is removed from the state of FIG. 9.

As illustrated in FIGS. 7, 8, and 10, the first drive gear 28, the second drive gear 29, the first agitator gear 254, and the second agitator gear 264 are positioned directly at the first outer surface 211. On the other hand, as illustrated in FIG. 7, the developing roller gear 223, the supply roller gear 233, and the coupling 24 are attached to the first outer surface 211 through the support member 31.

The idle gear 27 includes a first idle gear portion 27*a*, a second idle gear portion 27*b*, and a third idle gear portion 27*c*. As illustrated in FIG. 8, the first idle gear portion 27*a* and the third idle gear portion 27*c* are positioned further in a direction from the other side to the one side in the first direction than the support member 31. As illustrated in FIG. 9, the second idle gear portion 27*b* is positioned further in a direction from the one side to the other side in the first direction than the support member 31.

In FIGS. 6 through 11, gear teeth of the developing roller gear 223, the supply roller gear 233, the first agitator gear 254, the second agitator gear 264, the coupling 24, the idle gear 27, the first drive gear 28, and the second drive gear 29 are not delineated. Although these gears transmit rotation force by meshing engagements therebetween, these gears may be replaced with gears which transmit rotation force by frictional force. For example, these gears may have outer circumferential surfaces made of rubber, instead of the gear teeth.

The coupling 24 illustrated in FIGS. 6 and 7 is a gear that firstly receives driving force supplied from the drive shaft of the image forming apparatus 100. The coupling 24 is positioned at the first outer surface 211 of the casing 21 in the first direction. The coupling 24 is rotatable about a coupling axis 241 extending in the first direction. The coupling 24 includes a coupling gear portion in meshing engagement with the idle gear 27. The coupling 24 is also in meshing engagement with both the developing roller gear 223 and the supply roller gear 233. With this structure, when the coupling 24 rotates about the coupling axis 241 in response to the driving force from the drive shaft, the idle gear 27, the developing roller gear 223, and the supply roller gear 233 which are in meshing engagement with the coupling 24 also rotate. The coupling 24 is rotatably supported by the support member 31.

The idle gear 27 illustrated in FIGS. 6 through 8 is configured to transmit rotation of the coupling 24 to the first agitator gear 254. The idle gear 27 is rotatable about an idle axis 271 extending in the first direction. The idle gear 27 includes the first idle gear portion 27*a*, the second idle gear portion 27*b* (see FIGS. 9 and 10), and the third idle gear portion 27*c*, which are arrayed in the first direction.

The first idle gear portion 27*a*, the second idle gear portion 27*b*, and the third idle gear portion 27*c* have diameters different from one another. The second idle gear portion 27*b* is positioned closer to the first outer surface 211 of the casing 21 in the first direction than both of the first idle gear portion 27*a* and the third idle gear portion 27*c* are to the first outer surface 211. Specifically, the second idle gear portion 27*b* is accommodated in a recessed portion 211*a* of the first outer surface 211 of the casing 21. The third idle gear portion 27*c* is positioned between the first idle gear portion 27*a* and the second idle gear portion 27*b* in the first direction. The third idle gear portion 27*c* is in meshing engagement with the first agitator gear 254. The first idle gear portion 27*a* is in meshing engagement with the coupling gear portion of the coupling 24. The second idle gear portion 27*b* is in meshing engagement with the first drive gear 28.

The first drive gear 28 and the second drive gear 29 illustrated in FIG. 10 are configured to transmit rotation of the idle gear 27 to the second agitator gear 264. The first drive gear 28 is rotatable about a first drive axis 281 extending in the first direction. The first drive gear 28 is in meshing engagement with the second idle gear portion 27*b* of the idle gear 27. The first drive gear 28 is accommodated in the recessed portion 211*a* of the first outer surface 211 of the casing 21. The second drive gear 29 is rotatable about a second drive axis 291 extending in the first direction. The second drive gear 29 is in meshing engagement with the first drive gear 28. The second drive gear 29 is accommodated in the recessed portion 211*a* of the first outer surface 211 of the casing 21.

The support member 31 illustrated in FIGS. 8 and 9 rotatably supports the coupling 24. The support member 31 has an approximately flat plate shape expanding in both the second direction and the third direction. As illustrated in FIG. 6, the support member 31 includes a hollow cylindrical portion 31*a*. The support member 31 has one side portion and the other side portion opposite to each other in the first direction; the one side portion is positioned at the one side in the first direction and the other side portion is positioned at the other side in the first direction. The hollow cylindrical portion 31*a* protrudes in the first direction from a flat surface positioned at the one side portion of the support member 31. The hollow cylindrical portion 31*a* is inserted in the coupling 24. With this structure, the coupling 24 is rotatably supported by the one side portion in the first direction of the support member 31.

The support member 31 partitions the internal space of the gear case 32 into one side space and the other side space in the first direction; the one side space is positioned at the one side in the first direction and the other side space positioned at the other side in the first direction. Specifically, the coupling 24, the developing roller gear 223, and the supply roller gear 233 are positioned in the one side space in the first direction of the support member 31. The support member 31 has a circular hole for allowing the developing roller shaft 222 and the supply roller shaft 232 to extend through the support member 31. On the other hand, the first drive gear 28, the second drive gear 29, and the second agitator gear 264 are positioned in the other side space in the first direction of the support member 31. Specifically, in a state where the first drive gear 28, the second drive gear 29, and the second agitator gear 264 are accommodated in the recessed portion 211*a* of the first outer surface 211 of the casing 21, the recessed portion 211*a* is partly covered with the support member 31 from the one side in the first direction. The recessed portion 211*a* is recessed in the direction from the one side to the other side in the first direction. The second idle gear portion 27*b* of the idle gear 27 is also accommodated in the recessed portion 211*a*.

Figure 11:
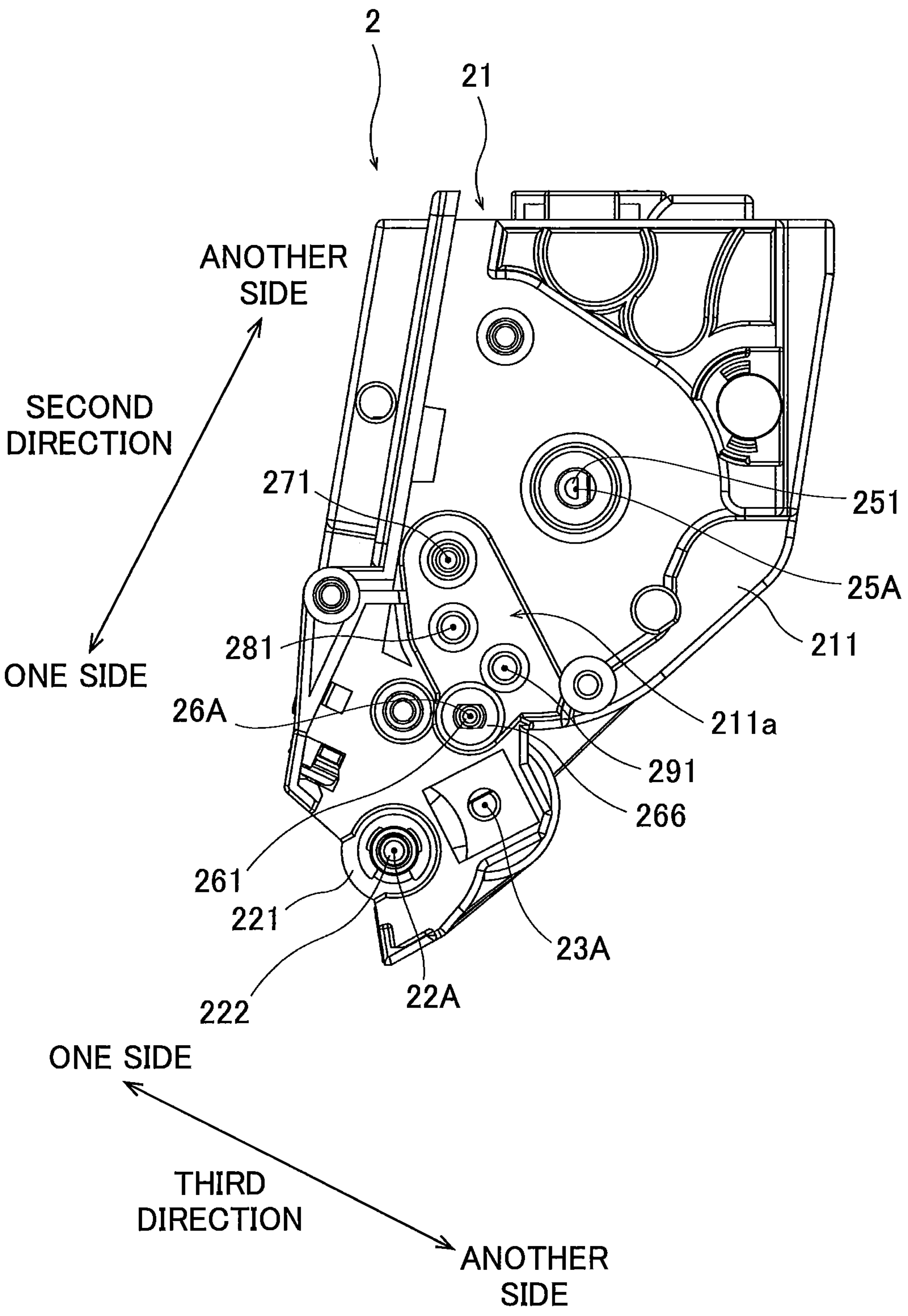
FIG. 11 is a view of the developing cartridge as viewed in the first direction and in a state where a first drive gear, a second drive gear, and a second agitator gear are removed from the state of FIG. 10.

FIG. 11 illustrates a state where the first drive gear 28, the second drive gear 29, and the second agitator gear 264 are removed from the state of FIG. 10. As illustrated in FIGS. 6 and 11, support shafts for rotatably supporting the idle gear 27, the first drive gear 28, and the second drive gear 29 protrudes from a bottom surface of the recessed portion 211*a* in the direction from the other side to the one side in the first direction. Further, the bottom portion of the recessed portion 211*a* has a through-hole for replenishing the internal space of the casing 21 with toner. A seal member 266 is accommodated in the through-hole. The seal member 266 has one side portion in the first direction; the one side portion is positioned at the one side in the first direction. The second agitator gear 264 is disposed at the one side portion in the first direction of the seal member 266. With this structure, since the second agitator gear 264 is positioned at the through-hole via the seal member 266, leakage of toner from the casing 21 is prevented.

In the image forming apparatus 100 constructed described above, when the coupling 24 rotates about the coupling axis 241 in response to the driving force from the drive shaft, the developing roller gear 223, the supply roller gear 233, and the idle gear 27 which are in meshing engagement with the coupling 24 rotate. By the rotation of the idle gear 27, the first agitator gear 254 in meshing engagement with the idle gear 27 also rotates. Further, by the rotation of the idle gear 27, the first drive gear 28 in meshing engagement with the idle gear 27 rotates. Upon the rotation of the first drive gear 28, the second drive gear 29 in meshing engagement with the first drive gear 28 rotates. In accordance with this rotation of the second drive gear 29, the second agitator gear 264 in meshing engagement with the second drive gear 29 also rotates.

In a case where the above-described gears engage, in accordance with the numbers of teeth of the gears, the second agitator gear 264 rotates at a rotation frequency greater than a rotation frequency of the first agitator gear 254. In the present embodiment, the rotation frequency of the second agitator gear 264 is about three to four times as great as the rotation frequency of the first agitator gear 254. However, the numbers of teeth of the gears and diameters of the gears are set so that a peripheral speed of the second agitator 26 is greater than or equal to a peripheral speed of the supply roller 23.

Note that no gear is provided between the idle gear 27 and the first agitator gear 254. On the other hand, an even number of gears (in the present embodiment, the first drive gear 28 and the second drive gear 29) are provided between the idle gear 27 and the second agitator gear 264. Therefore, the first agitator gear 254 and the second agitator gear 264 rotate in the same rotating direction (in the present embodiment, clockwise direction as viewed from the one side in the first direction).

In the printing process in the image forming apparatus 100, the outer circumferential surface of the photosensitive drum 11 is uniformly charged and then exposed by a laser beam or an LED beam, whereby an electrostatic latent image based on input image data is formed on the outer circumferential surface of the photosensitive drum 11. Further, while toner in the casing 21 is agitated by the rotating first agitator 25 and the rotating second agitator 26, the toner is supplied to the outer circumferential surface of the supply roller 23 and then supplied to the outer circumferential surface of the developing roller 22 from the outer circumferential surface of the supply roller 23. Subsequently, by the rotation of the developing roller 22, a thin layer of the toner is carried on the outer circumferential surface of the developing roller body 221.

The toner carried on the outer circumferential surface of the developing roller 22 is supplied to the electrostatic latent image formed on the outer circumferential surface of the photosensitive drum 11. Hence, the electrostatic latent image becomes a visible toner image on the outer circumferential surface of the photosensitive drum 11. The toner image is transferred onto a recording surface of a printing sheet, and then the toner image is thermally fixed, terminating the printing process.

As described above, the developing cartridge 2 according to the embodiment includes the casing 21, the developing roller 22, the first agitator 25, the supply roller 23, and the second agitator 26. Here, a rotation locus of the second agitator fin 263 of the second agitator 26 is positioned outside of a rotation locus of the first agitator fin 253 of the first agitator 25. Hence, in the internal space of the casing 21, toner positioned at a region where sufficient agitation of the toner cannot be achieved by only rotation of the first agitator 25 can be agitated by rotation of the second agitator 26. Accordingly, sufficient agitation of toner can be performed even if remaining amount of the toner in the internal space of the casing 21 becomes low.

Further, in the developing cartridge 2 according to the embodiment, the second agitator 26 is positioned closer to the supply roller 23 in the second direction than the first agitator 25 is to the supply roller 23. Hence, toner stagnating around the supply roller 23 can be agitated by rotation of the second agitator 26. Accordingly, stagnation of a toner flow around the supply roller 23 in the internal space of the casing 21 can be restrained.

Further, in the developing cartridge 2 according to the embodiment, the first agitator 25 and the second agitator 26 rotate in the same rotating direction. Hence, a toner flow formed by rotation of the second agitator 26 can be easily merged into a toner flow formed by rotation of the first agitator 25. As a result, toner stagnating in the casing 21 can be introduced into the agitating region of the first agitator 25, thereby sufficiently performing agitation of toner in its entirety.

Further, the developing cartridge 2 according to the embodiment includes the coupling 24, the developing roller gear 223, the supply roller gear 233, the first agitator gear 254, the second agitator gear 264, the idle gear 27, the first drive gear 28, and the second drive gear 29. In this way, the developing cartridge 2 includes an even number of drive gears, namely, the first drive gear 28 and the second drive gear 29. Hence, the first agitator 25 and the second agitator 26 can be rotated with a constant speed ratio. Further, the first agitator 25 and the second agitator 26 rotate in the same rotating direction when viewed in the first direction. Thus, a toner flow formed by agitation by the second agitator 26 can be easily merged with a toner flow formed by agitation by the first agitator 25. In another aspect, in a region between the outer circumferential surface of the second agitator 26 and the outer circumferential surface of the supply roller 23, the rotating directions of the second agitator 26 and the supply roller 23 are the same direction when viewed in the first direction. As a result, toner can be easily supplied to the outer circumferential surface of the supply roller 23 by rotation of the second agitator 26.

Further, in the developing cartridge 2 according to the embodiment, the developing roller gear 223 and the supply roller gear 233 are positioned at the one side portion in the first direction of the support member 31, whereas the first drive gear 28, the second drive gear 29, and the second agitator gear 264 are positioned at the other side portion in the first direction of the support member 31. With this configuration, the developing roller gear 223, the supply roller gear 233, the first drive gear 28, the second drive gear 29, and the second agitator gear 264 can be divided into the one side portion and the other side portion in the first direction of the support member 31 and each disposed at the corresponding one of the two side portions. As a result, high layout density of the gears can be realized in a limited space, thereby rendering the developing cartridge 2 compact.

Further, in the developing cartridge 2 according to the embodiment, the first outer surface 211 of the casing 21 has the recessed portion 211*a* recessed in the direction from the one side to the other side in the first direction. The first drive gear 28, the second drive gear 29, and the second agitator gear 264 are accommodated in the recessed portion 211*a*. With this structure, the first drive gear 28, the second drive gear 29, and the second agitator gear 264 can be additionally accommodated in the gear case 32 with almost no modification to the conventional layout of gears, such as the coupling 24, the developing roller gear 223, and the supply roller gear 233. Hence, the second agitator 26 can be easily employed in the developing cartridge 2.

Further, in the developing cartridge 2 according to the present embodiment, the rotation frequency of the second agitator 26 is greater than the rotation frequency of the first agitator 25. Further, a diameter of the second agitator fin 263 about the second agitator rotation axis 26A is smaller than a diameter of the first agitator fin 253 about the first agitator rotation axis 25A. Hence, by rotation of the second agitator 26 which is smaller than the first agitator 25 and rotates at a higher speed than the first agitator 25, toner stagnating in the internal space of the casing 21 can be easily introduced to the wider agitating region of the first agitator 25.

Further, in the developing cartridge 2 according to the present embodiment, the peripheral speed of the second agitator 26 (i.e., the moving speed of the second agitator fin 263) is greater than or equal to the peripheral speed of the supply roller 23 (i.e., the moving speed of the outer circumferential surface of the supply roller body 231). Hence, shortage of toner supply to the supply roller 23 can be prevented.

Further, in the developing cartridge 2 according to the embodiment, the first agitator fin 253 and the second agitator fin 263 do not contact each other. With this configuration, generation of an intricate toner flow in the internal space of the casing 21 due to interference between the first agitator fin 253 and the second agitator fin 263 can be prevented, thereby facilitating uniform agitation of toner.

Further, in the developing cartridge 2 according to the present embodiment, the first agitator fin 253 is a sheet-shaped film. Hence, by rotation of the first agitator 25, the tip end portion of the first agitator fin 253 can be flexed while contacting the inner surface of the casing 21. Accordingly, toner adhering to the inner surface of the casing 21 can be scraped off. As a result, the toner in the casing 21 can be mixed further uniformly. In other words, toner stagnation can be suppressed over the entire internal space of the casing 21.

Further, in the developing cartridge 2 according to the embodiment, the second agitator 26 has a polygonal column shape whose corner portions each function as the second agitator fin 263. Hence, the second agitator fin 263 having high rigidity can be realized.

<4. Modifications>

While the description has been made in detail with reference to the specific embodiment, it would be apparent to those skilled in the art that many modifications and variations may be made thereto. Various modifications of the above-described embodiment will be simply described next.

Although the second agitator 26 has a triangular prism shape rotatable about the second agitator rotation axis 26A in the above-described embodiment, the shape of the second agitator 26 is not limited to the triangular prism shape. For example, the second agitator 26 may have a pentagonal prism shape or hexagonal prism shape, in place of the triangular prism shape.

Further, the shape of the second agitator 26 is not limited to any polygonal prism shape. For example, the second agitator fin 263 of the second agitator 26 may include: a rotary member rotatable about the second agitator rotation axis 26A; and a plurality of fin portions each extending radially outwardly from the rotary member. The fin portions may have a flat shape or curved shape. According to this modification, the surface area of the second agitator fin 263 can be increased. As a result, toner stagnating in the internal space of the casing 21 can be sufficiently agitated by the second agitator fin 263.

In the above-described embodiment, the first agitator fin 253 is a sheet-shaped film. However, a plastic thin plate may be available as the first agitator fin 253.

The developing roller gear 223, the supply roller gear 233, the first agitator gear 254, the second agitator gear 264, the coupling 24, the idle gear 27, the first drive gear 28, and the second drive gear 29 may be positioned at the second outer surface 212 that is an outer surface of the casing 21 at the other side in the first direction.

Further, the detailed configuration of the developing cartridge may be suitably modified. Additionally, various features appearing in the above embodiment and modifications thereof may be suitably combined together as long as no contradiction arises.

What is claimed is:

1. A developing cartridge comprising:

a developing roller rotatable about a developing roller rotation axis extending in a first direction;

a casing configured to accommodate toner, wherein the casing has one end portion in the first direction, the one end portion including an outer surface;

an agitator rotatable about an agitator rotation axis extending in the first direction;

a coupling positioned at the outer surface, the coupling including a coupling gear rotatable about a coupling axis extending in the first direction;

an idle gear rotatable about an idle axis, the idle gear including:

a first idle gear portion being in meshing engagement with the coupling gear; and a second idle gear portion positioned at a position different from a position of the first idle gear portion in the first direction, the second idle gear portion aligned with the first idle gear portion in the first direction;

an agitator gear positioned at the outer surface, the agitator gear being rotatable together with the agitator, the agitator gear being rotatable according to rotation of the second idle gear portion, the agitator gear being positioned closer to the outer surface in the first direction than the coupling is to the outer surface; and a plate extending in both a second direction and a third direction, the second direction crossing the first direction, the third direction crossing both the first direction and the second direction, the plate having one side portion and another side portion opposite to each other in the first direction, the one side portion being positioned farther from the outer surface than the another side portion is from the outer surface in the first direction, wherein the coupling gear and the first idle gear portion are positioned at the one side portion of the plate in the first direction, and wherein the second idle gear portion and the agitator gear are positioned at the another side portion of the plate in the first direction.

2. The developing cartridge according to claim 1, wherein the coupling includes a protrusion which extends in the first direction and has a hole, and wherein the protrusion is positioned at the one side portion of the plate in the first direction, the protrusion being positioned farther away from the plate than the coupling gear is from the plate in the first direction.

3. The developing cartridge according to claim 1, wherein at least a part of the agitator gear is covered by the plate in the first direction.

4. The developing cartridge according to claim 1, wherein the developing roller is positioned at one end of the casing in the second direction, and wherein a part of the agitator gear is positioned between the coupling gear and the second idle gear portion in the second direction.

5. The developing cartridge according to claim 1, wherein at least a part of the agitator gear overlaps with the plate in the first direction.

6. The developing cartridge according to claim 1, wherein the coupling is rotatably supported at the one side portion of the plate.

7. The developing cartridge according to claim 1, further comprising:

a developing roller gear rotatable together with the developing roller, the developing roller gear being in meshing engagement with the coupling gear;

a supply roller rotatable about a supply roller rotation axis extending in the first direction; and a supply roller gear rotatable together with the supply roller, wherein the developing roller gear and the supply roller gear are positioned at the one side portion of the plate in the first direction.

8. A developing cartridge comprising:

a developing roller rotatable about a developing roller rotation axis extending in a first direction;

a casing configured to accommodate toner, wherein the casing has one end portion in the first direction, the one end portion including an outer surface;

an agitator rotatable about an agitator rotation axis extending in the first direction;

a coupling positioned at the outer surface, the coupling including a coupling gear rotatable about a coupling axis extending in the first direction;

an idle gear rotatable about an idle axis, the idle gear including:

a first idle gear portion being in meshing engagement with the coupling gear; and a second idle gear portion positioned at a position different from a position of the first idle gear portion in the first direction, the second idle gear portion aligned with the first idle gear portion in the first direction;

an agitator gear positioned at the outer surface, the agitator gear being rotatable together with the agitator, the agitator gear being rotatable according to rotation of the second idle gear portion, the agitator gear being positioned closer to the outer surface in the first direction than the coupling is to the outer surface; and a plate extending in both a second direction and a third direction, the second direction crossing the first direction, the third direction crossing both the first direction and the second direction, the plate having one side portion and another side portion opposite to each other in the first direction, the another side portion facing the one end portion of the casing in the first direction, wherein the coupling gear and the first idle gear portion are positioned at the one side portion of the plate in the first direction, and wherein the second idle gear portion and the agitator gear are positioned at the another side portion of the plate in the first direction.

9. The developing cartridge according to claim 8, wherein the coupling includes a protrusion which extends in the first direction and has a hole, and wherein the protrusion is positioned at the one side portion of the plate in the first direction, the protrusion being positioned farther away from the plate than the coupling gear is from the plate in the first direction.

10. The developing cartridge according to claim 8, wherein at least a part of the agitator gear is covered by the plate in the first direction.

11. The developing cartridge according to claim 8, wherein the developing roller is positioned at one end of the casing in the second direction, and wherein a part of the agitator gear is positioned between the coupling gear and the second idle gear portion in the second direction.

12. The developing cartridge according to claim 8, wherein at least a part of the agitator gear overlaps with the plate in the first direction.

13. The developing cartridge according to claim 8, wherein the coupling is rotatably supported at the one side portion of the plate.

14. The developing cartridge according to claim 8, further comprising:

a developing roller gear rotatable together with the developing roller, the developing roller gear being in meshing engagement with the coupling gear;

a supply roller rotatable about a supply roller rotation axis extending in the first direction; and a supply roller gear rotatable together with the supply roller, wherein the developing roller gear and the supply roller gear are positioned at the one side portion of the plate in the first direction.

15. A developing cartridge comprising:

a developing roller rotatable about a developing roller rotation axis extending in a first direction;

a casing configured to accommodate toner, wherein the casing has one end portion in the first direction, the one end portion including an outer surface;

an agitator rotatable about an agitator rotation axis extending in the first direction;

a coupling positioned at the outer surface, the coupling including a coupling gear rotatable about a coupling axis extending in the first direction;

an idle gear rotatable about an idle axis, the idle gear including:

a first idle gear portion being in meshing engagement with the coupling gear; and a second idle gear portion positioned at a position different from a position of the first idle gear portion in the first direction, the second idle gear portion aligned with the first idle gear portion in the first direction;

an agitator gear positioned at the outer surface, the agitator gear being rotatable together with the agitator, the agitator gear being rotatable according to rotation of the second idle gear portion, the agitator gear being positioned closer to the outer surface in the first direction than the coupling is to the outer surface; and a plate extending in both a second direction and a third direction, the second direction crossing the first direction, the third direction crossing both the first direction and the second direction, one side relative to the plate being positioned farther from the outer surface than another side relative to the plate is from the outer surface in the first direction, wherein the coupling gear and the first idle gear portion are positioned at the one side relative to the plate in the first direction, and wherein the second idle gear portion and the agitator gear are positioned at the another side relative to the plate in the first direction.

16. The developing cartridge according to claim 15, wherein the coupling includes a protrusion which extends in the first direction and has a hole, and wherein the protrusion is positioned at the one side relative to the plate in the first direction, the protrusion being positioned farther away from the plate than the coupling gear is from the plate in the first direction.

17. The developing cartridge according to claim 15, wherein at least a part of the agitator gear is covered by the plate in the first direction.

18. The developing cartridge according to claim 15, wherein the developing roller is positioned at one end of the casing in the second direction, and wherein a part of the agitator gear is positioned between the coupling gear and the second idle gear portion in the second direction.

19. The developing cartridge according to claim 15, wherein at least a part of the agitator gear overlaps with the plate in the first direction.

20. The developing cartridge according to claim 15, wherein the plate rotatably supports the coupling at the one side relative to the plate.

21. The developing cartridge according to claim 15, further comprising:

a developing roller gear rotatable together with the developing roller, the developing roller gear being in meshing engagement with the coupling gear;

a supply roller rotatable about a supply roller rotation axis extending in the first direction; and a supply roller gear rotatable together with the supply roller, wherein the developing roller gear and the supply roller gear are positioned at the one side relative to the plate in the first direction.

* * * * *